United States Patent
Wang

(10) Patent No.: US 9,521,014 B2
(45) Date of Patent: Dec. 13, 2016

(54) NETWORK SYSTEM AND DATA TRANSMISSION METHOD

(71) Applicant: ACCTON TECHNOLOGY CORPORATION, Hsinchu (TW)

(72) Inventor: Ran-Yih Wang, Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 36 days.

(21) Appl. No.: 14/745,619

(22) Filed: Jun. 22, 2015

(65) Prior Publication Data

US 2015/0372920 A1    Dec. 24, 2015

(30) Foreign Application Priority Data

Jun. 23, 2014 (TW) .............................. 103121510 A

(51) Int. Cl.
| | |
|---|---|
| H04L 12/24 | (2006.01) |
| H04L 12/64 | (2006.01) |
| H04L 12/28 | (2006.01) |
| H04L 12/46 | (2006.01) |
| H04L 12/931 | (2013.01) |

(52) U.S. Cl.
CPC ........... *H04L 12/64* (2013.01); *H04L 12/2854* (2013.01); *H04L 12/4633* (2013.01); *H04L 41/0654* (2013.01); *H04L 49/70* (2013.01)

(58) Field of Classification Search
CPC ... H04L 12/4633; H04L 12/4641; H04L 69/22
See application file for complete search history.

(56) References Cited

U.S. PATENT DOCUMENTS

| | | | |
|---|---|---|---|
| 8,391,289 B1 | 3/2013 | Yalagandula et al. | |
| 8,451,715 B1 * | 5/2013 | Doshi | ..................... H04L 45/66 370/218 |
| 2013/0322441 A1 | 12/2013 | Anumala | |

* cited by examiner

*Primary Examiner* — Jamal Javaid
(74) *Attorney, Agent, or Firm* — Birch, Stewart, Kolasch & Birch, LLP

(57) ABSTRACT

A data transmission method and network system are provided. The data transmission method is applied to a data center when a data packet can't be transmitted from the first virtual machine of a first server to the second virtual machine of a second server due to the data center occurring lookup fail. The data transmission method includes the steps of transmitting the data packet through a downlink port of a first TOR switch according to an ISID; encapsulating the data packet and setting a CVID to a first value; transmitting the encapsulated data packet to a first spine switch; and transmitting the encapsulated data packet to the second virtual machine by the first spine switch according to the flooding information, wherein the flooding information is generated according to an f-BVID.

14 Claims, 2 Drawing Sheets

NETWORK SYSTEM AND DATA TRANSMISSION METHOD

CROSS REFERENCE TO RELATED APPLICATIONS

This Application claims priority of Taiwan Patent Application No. 103121510, filed on Jun. 23, 2014, the entirety of which is incorporated by reference herein.

BACKGROUND OF THE INVENTION

Field of the Invention

The disclosure is related to data-transmission technology of a data center, and, more particularly, to the data-transmission technology for occurrence of data-flooding in the datacenter.

Description of the Related Art

Recently, because of the rapid development of information technology, different kinds of network infrastructures, such as server systems or data centers, are widely applied in daily life.

Generally, the data center network system comprises a plurality of Top-of-Rack switches (TOR switches), a server, and at least one spine switch. The server may comprise a plurality of virtual machines (VM). Therefore, the virtual machines of different servers can transmit data through the switches and spine switches in the constructed network infrastructure of the network system.

However, when data packet is unable to be transmitted to the target server due to the switch occurring lookup fail, data-flooding will happen. That is to say, after the Top-of-Rack switch knows that a lookup-fail has occurred in the switch, the Top-of-Rack switch will transmit the data packet to other ports-except the port originally configured to receive the data packet. However, the servers connected with some switches don't need the data packet, and therefore transmitting the data packet to all switches and servers is very inefficient and uses a lot of bandwidths, resulting in delaying other normal transmissions. Therefore, when data-flooding occurs, how to control and deal with the data-flooding is a subject worthy of discussion.

BRIEF SUMMARY OF THE INVENTION

A network system and data transmission method are provided to overcome the problems mentioned above. When data-flooding has occurred in the data center, the flooding information can be generated according to a flooding-backbone virtual local area network identifier (f-BVID).

An embodiment of the invention provides a network system. The network system is applied to perform data transmission in a data center. The network system comprises a controller, a first server, a second server, a first Top-of-Rack (TOR) switch, a second TOR switch, and a first spine switch. The controller generates flooding information according a flooding-backbone virtual local area network identifier (f-BVID). The first server comprises a first virtual machine corresponding to a first Tenant ID, wherein the first virtual machine generates and outputs a data packet. The second server comprises a second virtual machine corresponding to the first Tenant ID. The TOR switch is connected with the first server and receives the data packet from the first server. The second TOR switch is connected with the second server. The first spine switch is connected with the first TOR switch and the second TOR switch, receives the data packet from the first TOR switch and transmits the data packet to the second TOR switch according to the flooding information. When the lookup fail has occurred in the first TOR switch and the first TOR switch can't transmit the data packet to the second virtual machine, the first TOR switch transmits the data packet through a downlink port of the first TOR switch according to a service instance identifier (ISID), and the first TOR switch encapsulates the data packet, sets a customer virtual local area network identifier (CVID) as a first value, and transmits the data packet to the first spine switch.

An embodiment of the invention provides a data transmission method. The data transmission method is applied to a data center when a data packet can't be transmitted from a first virtual machine of a first server to a second virtual machine of a second server due to the data center occurring lookup failure. The data transmission method comprises the steps of transmitting the data packet through a downlink port of a first TOR switch according to an ISID; encapsulating the data packet and setting a CVID as a first value; transmitting the encapsulated data packet to a first spine switch; and transmitting the encapsulated data packet to the second virtual machine by the first spine switch according to the flooding information, wherein the flooding information is generated according to an f-BVID.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
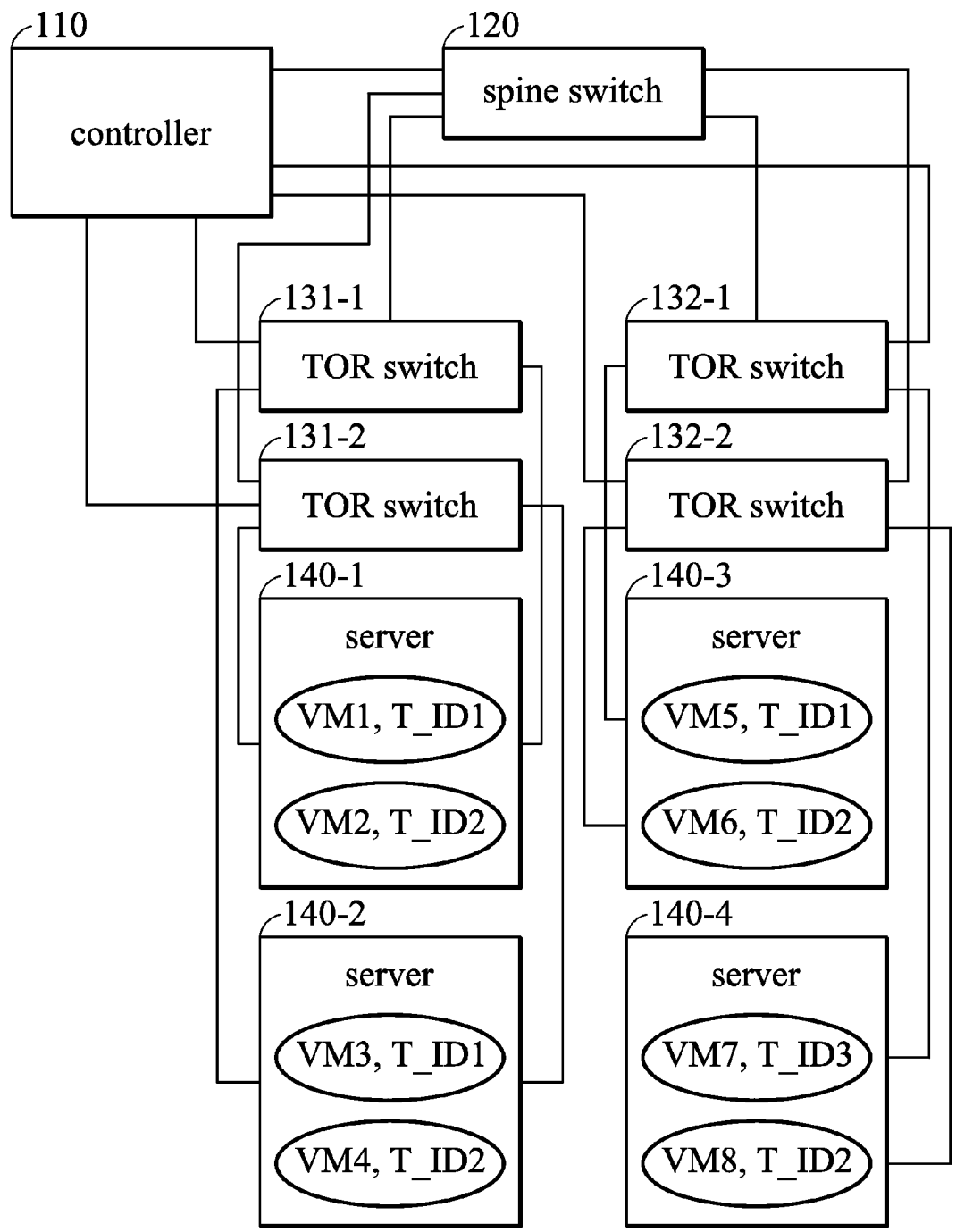
FIG. 1 is block diagram illustrating the network system 100 according to an embodiment of the invention.

FIG. 1 is block diagram illustrating the network system 100 according to an embodiment of the invention. The network system 100 is applied for data transmission of a data center. As shown in FIG. 1, in an embodiment of the invention, the network system 100 comprises a controller 110, a spine switch 120, Top-of-Rack switches (TOR switches) 131-1, 131-2, 132-1 and 132-2, servers 140-1, 140-2, 140-3 and 140-4. Note that the number of spine switches, Top-of-Rack switches, servers and controllers shown in FIG. 1 is just to clarify the concept of the invention. However, the invention should not be limited thereto. Those who are skilled in this technology can also apply other numbers of spine switches, Top-of-Rack switches, servers and controllers for the configurations of different data centers after referring to the embodiments of the invention.

In an embodiment of the invention, the controller 110 is connected with the spine switch 120 and the TOR switches 131-1, 131-2, 132-1 and 132-2. The controller 110 generates flooding information according to an f-BVID (flooding-backbone virtual local area network identifier). The flooding information means that the controller 110 may establish a flooding tree according to the f-BVID. That is to say, when data-flooding has occurred, the spine switch 120 only needs to transmit the data packet to the TOR switches which are configured in the flooding tree. In some embodiments of the invention, the network system 100 in the data center may be configured to have at least one controller to realize these embodiments. However, in other embodiments of the invention, the data center may have at least two controllers for redundancy. During the operation of the network system 100, the two controllers are activated and perform data transmission at the same time. Only when one of the controllers has failed will the other controller carry on the transmission of the failed controller to avoid a situation in which the data center can't be operated normally because one controller has broken down or doesn't generate a response. In FIG. 1 there is only one controller illustrated, but this is used merely to clarify the concept of the invention, and the invention should not be limited thereto. The controller 110 may transmit flooding information to the spine switch 120 and TOR switches 131-1, 131-2, 132-1 and 132-2 periodically. In addition, when the link status has been changed, the spine switch 120 will transmit a link status packet to the controller 110 to notify the controller of the current link status. The controller 110 will update and maintain the flooding information according to the current link status and then transmit the updated flooding information to the spine switch 120 and all TOR switches. In an embodiment of the invention, the controller can be built in one or more TOR switches, built in one or more servers, or built in one or more virtual hosts. In another embodiment of the invention, the controller can be an external controller, e.g. OpenFlow controller. FIG. 1 adopts an external controller as the controller 110 for illustrating the embodiments of the invention.

The spine switch 120 is configured to connect with the TOR switches of each branch, wherein one branch comprises two TOR switches for redundancy. During the operation of the network system 100, the two TOR switches are activated and perform data transmission at the same time. Only when one of the TOR switches has failed will the other TOR switch carry on the transmission of the failed TOR switch to avoid a situation in which the data center can't be operated normally because one TOR switch is broken or doesn't generate a response. For example, as shown in FIG. 1, the TOR switches 131-1 and 131-2 are configured to the first branch and connected to the servers 140-1 and 140-2 respectively; and the TOR switches 132-1 and 132-2 are configured to the second branch and connected to the servers 140-3 and 140-4 respectively. Note that the spine switch 120 can comprise more than two branches. In FIG. 1 there are only two branches but it is to clarify the concept of the invention and the invention should not be limited thereto. In an embodiment of the invention, the network system 100 can also be comprised another spine switch (not shown in figures). This spine switch is also connected with the TOR switches of each branch, wherein when the link fail has occurred in the spine switch 120 and the first branch and/or second branch, i.e. the spine switch 120 can't transmit data to the first branch and/or second branch, this spine switch will supersede the spine switch 120 to transmit data to the first branch and/or second branch.

Each of the servers may comprise one or more virtual machines (VM), wherein the following description will use two virtual machines comprised in one server as an example.

In addition, each virtual machine has its corresponding Tenant ID, and only when the Tenant IDs of the virtual machines are the same can the virtual machines receive the data packet from each other. As shown in FIG. 1, the server 140-1 has virtual machines VM1 and VM2, the server 140-2 has virtual machines VM3 and VM4, the server 140-3 has virtual machines VM5 and VM6, and the server 140-4 has virtual machines VM7 and VM8, wherein the virtual machines VM1, VM3, VM5 correspond to the Tenant ID T_ID1, the virtual machines VM2, VM4, VM6, VM8 correspond to the Tenant ID T_ID2, and the virtual machine VM 7 corresponds to the Tenant ID T_ID3.

When the virtual machine transmits the data to the other virtual machine which has the same Tenant ID as this virtual machine, e.g. when the virtual machine VM1 of the server 140-1 transmits the data to the virtual machine VM5 of the server 140-3, the virtual machine (VM1) will generate a data packet (e.g. a Ethernet packet) and then the server 140-1 will transmit the data packet to the TOR switch 131-1. The TOR switch 131-1 will generate a service instance identifier (ISID) according to the serving tag virtual local area network identifier (SVID) and a customer VLAN (virtual local area network) ID (CVID) embedded in the data packet. Then, the TOR switch 131-1 further searches the port from its mac table for transmitting the data packet according to the IP address and MAC address information of the virtual machine VM5.

When a lookup fail has occurred in the TOR switch 131-1, i.e. the TOR switch 131-1 can't find the port for transmitting the data packet from the mac table so that the data packet can't be transmitted to the virtual machine VM5, the TOR switch 131-1 will transmit the data packet through its downlink port to other servers (except server 140-1) which comprise the virtual machines corresponding to the Tenant ID T_ID1 as the virtual machine VM5 in the first branch according to the service instance identifier (ISID). That is to say, the TOR switch 131-1 can find the downlink port which corresponds to the service instance identifier (ISID) from all its downlink ports according to the service instance identifier (ISID) to know whether the servers connected with the downlink port comprise the virtual machines corresponding to the Tenant ID T_ID1, and then transmit the data packet to the servers (except server 140-1) which comprise the virtual machines corresponding to the Tenant ID T_ID1. For example, the server 140-2 comprises the virtual machine VM 3 corresponding to the Tenant ID T_ID1, and therefore the TOR switch 131-1 will transmit the data packet to the server 140-2 and then the server 140-2 will transmit the data packet to the virtual machine VM 3 corresponding to the Tenant ID T_ID1.

In addition, the TOR switch 131-1 may encapsulate a MAC header into the data packet, wherein the MAC header is configured to transform a backbone virtual local area network identifier (BVID) into the f-BVID, and the f-BVID is configured to determine which TOR switches should be comprised in the flooding tree when the data flooding happens. In addition, the TOR switch 131-1 may set the CVID as a first value (e.g. 1). Then, the TOR switch 131-1 transmits the encapsulated data packet to the spine switch 120 through its downlink port. Note that the CVID being set as the first value means that merely the TOR switches corresponding to the CVID which is set as 1 are configured to transmit the data packet in the branch. Similarly, if the CVID is set as the second value (e.g. 2), it means that merely the TOR switches corresponding to the CVID which is set as 2 are configured to transmit the data packet in the branch. The setting is to avoid the server repeatedly receiving the data packet from the same TOR switch (or different TOR switches) in the same branch. For example, when the server 140-2 has received the data packet transmitted form the TOR switch 131-1, if the TOR switch 131-2 transmits the same data packet to the server 140-2 again, the data packet will be transmitted repeatedly. In the embodiment of the invention, TOR switches 131-1 and 132-1 correspond to the first value and TOR switches 131-2 and 132-2 correspond to the second value.

After the spine switch 120 receives the encapsulated data packet transmitted form the TOR switch 131-1, the TOR switch 131-1 will transmit the data packet to the TOR switches comprised in the flooding information according the flooding information transmitted by the controller 110. Specifically, the spine switch 120 only transmits the data packet to the TOR switches comprised in the flooding tree through its downlink port according to the flooding information, i.e. the spine switch 120 may determine whether to perform data transmission according to whether the branches of the TOR switches comprise the virtual machine corresponding to the Tenant ID. In other words, in the embodiment of the invention, the spine switch 120 only transmits the data packet to the TOR switches of the branches which comprise the virtual machine corresponding to the Tenant ID. On the other hand, if a branch doesn't comprise the virtual machine corresponding to the Tenant ID, the branch will not be comprised in the flooding tree, and the spine switch will not transmit the data packet to the TOR switches of the branch.

As shown in FIG. 1, because the virtual machine VM5 corresponds to the Tenant ID T_ID1, the spine switch 120 may transmit the data packet to the TOR switches 132-1 and 132-2 of the second branch.

In addition, when the TOR switch 132-1 receives the data packet transmitted from the spine switch 120, the TOR switch 132-1 will transmit the data packet through its downlink port to the servers in the second branch according to the ISID, wherein the TOR switch 132-1 determines whether to perform data transmission to the server by determining whether the server comprises the virtual machine corresponding to the Tenant ID T_ID1. In other words, in the embodiment of the invention, the TOR switch 132-1 only transmits the data packet to the servers which comprise the virtual machine corresponding to the Tenant ID T_ID1. On the other hand, if a server doesn't comprise the virtual machine corresponding to the Tenant ID, the server will not be comprised in the flooding tree, and the TOR switch 132-1 will not transmit the data packet to the server.

As shown in FIG. 1, the server 140-3 comprises the virtual machine VM5 which corresponds to the Tenant ID T_ID1, and therefore the TOR switch 132-1 will transmit the data packet to the server 140-3; and the server 140-4 doesn't comprise the virtual machine which corresponds to the Tenant ID T_ID1, and therefore the TOR switch 132-1 will not transmit the data packet to the server 140-4. After the server 140-3 receives the data packet, the server 140-3 will transmit the data packet to the virtual machine VM5 which corresponds to the Tenant ID T_ID1.

In the network system 100 of the embodiments of the invention, when a lookup fail has occurred, and a flooding operation needs to be performed for the data packet, the spine switch only needs to transmit the data packet to the TOR switches which are configured in the flooding tree according to the f-BVID, and the TOR switches can transmit the data packet through its downlink port to the servers which comprise the virtual machines corresponding to the Tenant ID according to the ISID. Therefore, in the network system 100, when a lookup fail has occurred, and a flooding operation needs to be performed for the data packet, the spine switch doesn't need to transmit the data packet to all TOR switches, and the TOR switches don't need to transmit the data packet to all the servers which they are connected with so that it can avoid having the data center waste bandwidth, thereby achieving more efficient data transmission.

Figure 2:
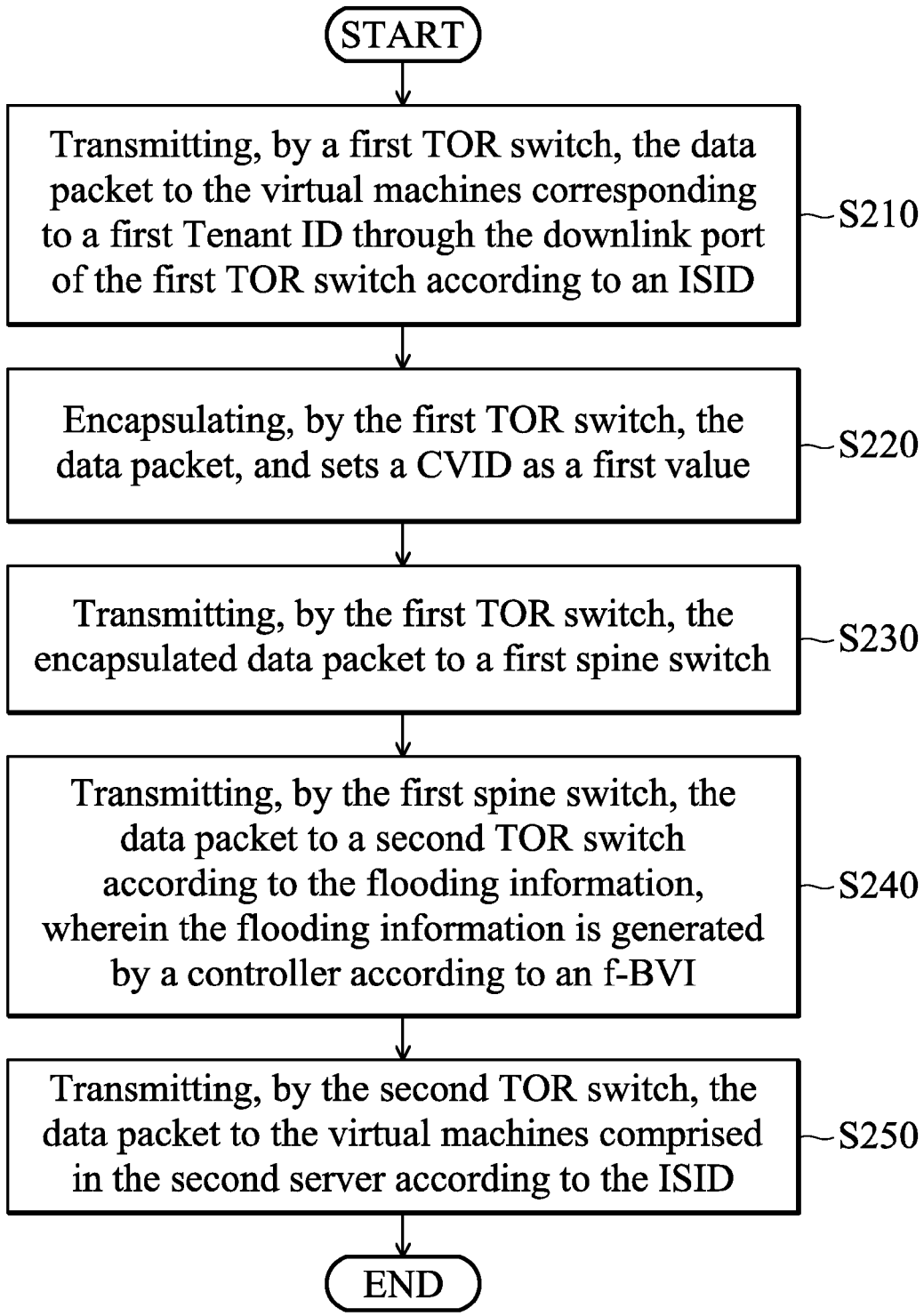
FIG. 2 is a flowchart 200 illustrating the data transmission method according to an embodiment of the invention.

FIG. 2 is a flowchart 200 illustrating the data transmission method according to an embodiment of the invention. The method is applied to a data center when the data packet can't be transmitted from a first virtual machine to a second virtual machine due to the data center occurring lookup failure, wherein the first virtual machine is comprised in a first server and the second virtual machine is comprised in a second server. In step S210, a first TOR switch transmits the data packet to the virtual machines corresponding to a first Tenant ID through the downlink port of the first TOR switch according to an ISID, wherein the first TOR switch is configured in a first branch and connected with the first server. In step S220, the first TOR switch encapsulates the data packet, and sets a CVID as a first value. In step S230, the first TOR switch transmits the encapsulated data packet to a first spine switch. In step S240, the first spine switch transmits the data packet to a second TOR switch according to the flooding information, wherein the second TOR switch is configured to have a second branch and is connected with the second server, and the flooding information is generated by a controller according to an f-BVID. In step S250, the second TOR switch transmits the data packet to the virtual machines comprised in the second server according to the ISID.

In an embodiment of the invention, the data transmission method further comprises the steps of activating a second spine switch when a link fail has occurred in the first spine switch and the first branch and/or the second branch. In an embodiment of the invention, the data transmission method further comprises the step of transforming a BVID into the f-BVID according to the MAC header when the first TOR switch encapsulates the MAC header into the data packet. In an embodiment of the invention, the data transmission method further comprises the step of transmitting a link status packet to the controller by the first spine switch to update and maintain the flooding information when the link status is changed.

Note that the network system and data transmission method of the invention are mainly applied to IEEE802.1ah Provider Backbone Bridges protocol (PBB protocol), which can also be referred to as a Mac-in-Mac protocol. However, the invention should not be limited thereto. Those who are skilled in this technology can still apply the network system and data transmission method of the invention to different network infrastructures without departing from the scope and spirit of this invention.

Therefore, in the data transmission method of the embodiments of the invention, when a lookup fail has occurred, and the data packet needs to perform a flooding operation (data-flooding has occurred), the spine switch doesn't need to transmit the data packet to all TOR switches, and the TOR switches don't need to transmit the data packet to all the servers which they are connected with so that it can avoid having the data center waste bandwidth, thus achieving more efficient data transmission.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects of the invention. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A network system, applied to perform data transmission in a data center, the network system comprising:
    a controller, generating flooding information according to a flooding-backbone virtual local area network identifier (f-BVID);
    a first server, comprising a first virtual machine corresponding to a first Tenant ID, wherein the first virtual machine generates and outputs a data packet;
    a second server, comprising a second virtual machine corresponding to the first Tenant ID;
    a first Top-of-Rack (TOR) switch, connected with the first server and receiving the data packet from the first server;
    a second TOR switch, connected with the second server; and
    a first spine switch, connected with the first TOR switch and the second TOR switch, configured to receive the data packet from the first TOR switch and transmit the data packet to the second TOR switch according to flooding information,
    wherein when the first TOR switch is unable to transmit the data packet to the second virtual machine due to the first TOR switch occurring lookup fail, the first TOR switch transmits the data packet through a downlink port of the first TOR switch according to a service instance identifier (ISID), and the first TOR switch encapsulates the data packet, sets a customer virtual local area network identifier (CVID) as a first value, and transmits the encapsulated data packet to the first spine switch.

2. The network system of claim 1, wherein the first spine switch transmits the encapsulated data packet to the second TOR switch and the second TOR switch transmits the encapsulated data packet to the second virtual machine of the second server according to the ISID.

3. The network system of claim 2, wherein the first TOR switch and the second TOR switch determines whether the connected server comprises the virtual machine corresponding to the first Tenant ID, and the first TOR switch and the second TOR switch transmit the encapsulated data packet to the second virtual machine corresponding to the first Tenant ID.

4. The network system of claim 1, further comprising:
    a third TOR switch, connected with the first server and the first spine switch, wherein the first TOR switch and the third TOR switch are configured in a first branch, and the first TOR switch and the second TOR switch correspond to the first value; and
    a fourth TOR switch, connected with the second server and the first spine switch, wherein the second TOR switch and the fourth TOR switch are configured in a second branch, and the third TOR switch and the fourth TOR switch correspond to a second value of the CVID,
    wherein when the CVID is set as the first value, merely the first TOR switch and the second TOR switch corresponding to the first value transmit the data packet; and
    wherein when the CVID is set as the second value, merely the third TOR switch and the fourth TOR switch corresponding to the second value transmit the data packet.

5. The network system of claim 4, further comprising:
    a second spine switch, connected with the first TOR switch, the second TOR switch, the third TOR switch and the fourth TOR switch, wherein when a link fail has occurred in the first spine switch and the first branch and/or second branch, the second spine switch supersedes the spine switch to transmit the data packet.

6. The network system of claim 1, wherein when the first TOR switch encapsulates a MAC header into the data packet, the first TOR switch transforms a BVID into the f-BVID according to the MAC header.

7. The network system of claim 1, wherein when a link status is changed, the first spine switch transmits a link status packet to the controller to update and maintain flooding information.

8. A data transmission method comprising:
    transmitting a data packet through a downlink port of a first Top-of-Rack (TOR) switch according to a service instance identifier (ISID);
    encapsulating the data packet and setting a customer virtual local area network identifier (CVID) as a first value;
    transmitting the encapsulated data packet to a first spine switch; and
    transmitting the encapsulated data packet to a second virtual machine by the first spine switch according to flooding information, wherein the flooding information is generated according to a flooding-backbone virtual local area network identifier (f-BVID),
    wherein the data transmission method is applied to a data center when the data packet is unable to be transmitted from a first virtual machine of a first server to the second virtual machine of a second server due to the data center occurring lookup failure.

9. The data transmission method of claim 8, wherein transmitting the encapsulated data packet to the second virtual machine by the first spine switch according to the flooding information comprises:
- transmitting the encapsulated data packet to a second TOR switch by the first spine switch; and
- transmitting the encapsulated data packet to the second virtual machine of the second server by the second TOR switch according to the ISID.

10. The data transmission method of claim 9, wherein the second TOR switch determines whether the server which the second TOR switch connects with comprises the virtual machine corresponding to the first Tenant ID and transmits the encapsulated data packet to the second virtual machine corresponding to the first Tenant ID.

11. The data transmission method of claim 10, wherein the data center further comprises a third TOR switch and a fourth TOR switch, wherein the third TOR switch is connected with the first server and the first spine switch, and the first TOR switch and the third TOR switch are configured in a first branch, and the first TOR switch and the second TOR switch correspond to the first value; and the fourth TOR switch is connected with the second server and the first spine switch, and the second TOR switch and the fourth TOR switch are configured in a second branch, and the third TOR switch and the fourth TOR switch correspond to a second value of the CVID; and wherein when the CVID is set as the first value, merely the first TOR switch and the second TOR switch corresponding to the first value transmit the data packet; and when the CVID is set as the second value, merely the third TOR switch and the fourth TOR switch corresponding to the second value transmit the data packet.

12. The data transmission method of claim 11, wherein when a link fail has occurred in the first spine switch and the first branch and/or second branch, a second spine switch supersedes the spine switch to transmit the data packet.

13. The data transmission method of claim 12, wherein when the first TOR switch encapsulates a MAC header into the data packet, the first TOR switch transforms a BVID into the f-BVID according to the MAC header.

14. The data transmission method of claim 8, wherein when a link status is changed, the first spine switch transmits a link status packet to the controller to update and maintain flooding information.

* * * * *